Aug. 8, 1933.                H. S. WALKER                1,921,057
                            DUCT CONNECTION BOX
                            Filed May 29, 1931
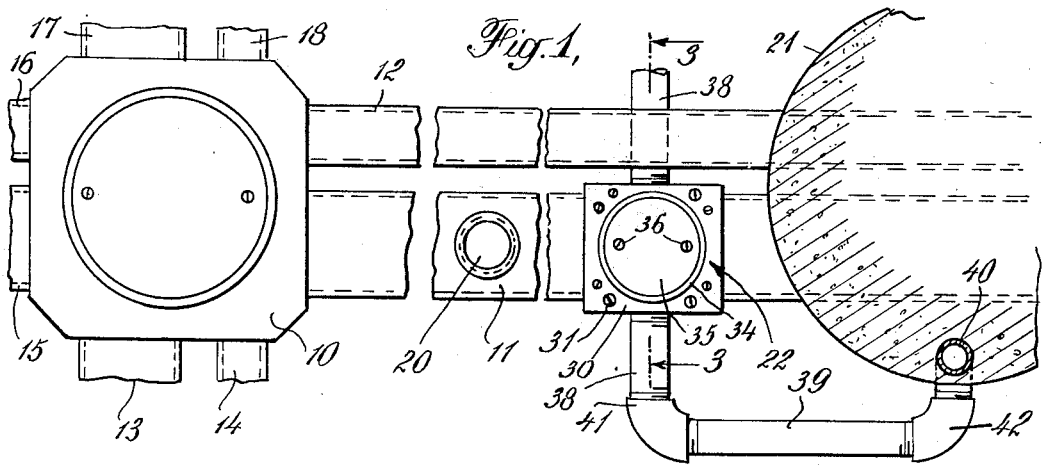
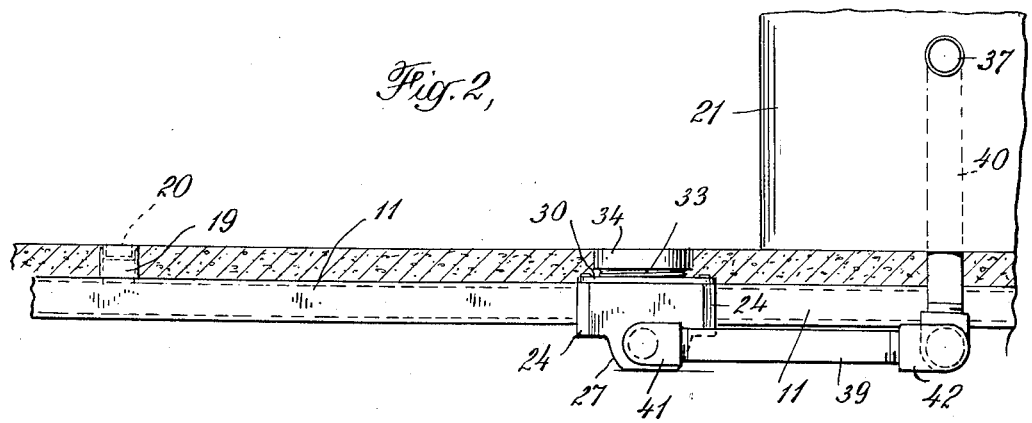
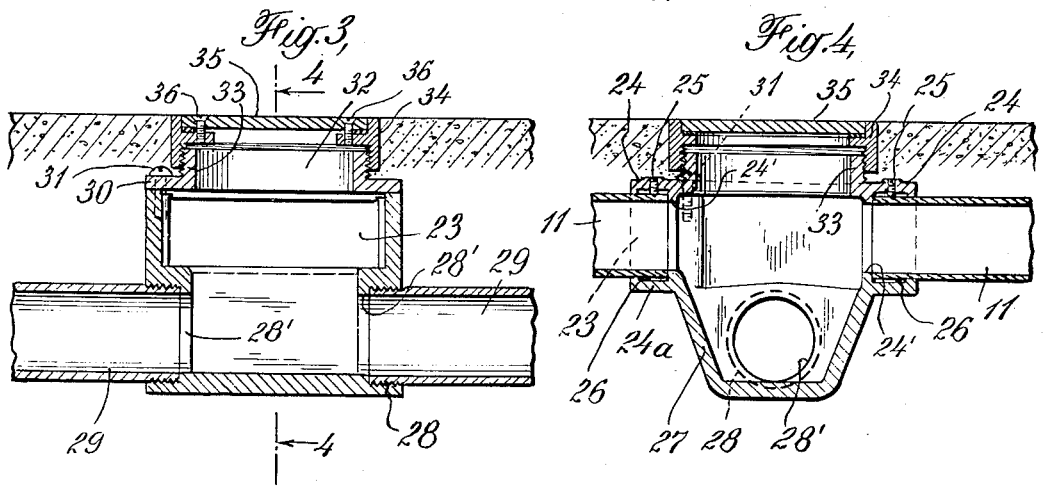
INVENTOR
Hervey S. Walker
BY
Pennie Davis Marvin Edmonds
ATTORNEYS Patented Aug. 8, 1933

1,921,057

UNITED STATES PATENT OFFICE 1,921,057

DUCT CONNECTION BOX

Hervey S. Walker, Ardmore, Pa.

Application May 29, 1931. Serial No. 540,942

2 Claims. (Cl. 247—19)

This invention relates to boxes for use in underfloor duct systems and is concerned more particularly with a box of simple, inexpensive construction by the use of which it is possible to provide extensions from the duct system for special purposes. The box of the invention may be installed in such a system in any convenient or desired location and it permits conduits to be connected to the system and connections to be made between wiring in the conduits and wiring in the ducts so that enclosed wiring may be led from the system at the box to points remote from the system as, for example, to a point on a wall or a column.

It is now common practice in modern concrete buildings, particularly those for office purposes, to install ducts for the electrical wiring in the floors prior to the completion of the floors so that wiring for electric lights, telephones, annunciators and the like may be concealed. Usually these ducts are arranged in a network with the runs of ducts as closely spaced as may be required by the demand of electric service. At the points where the ducts intersect, floor boxes are provided in which connections can be made.

In the duct system described in my Patent No. 1,592,548, July 13, 1926, the ducts are provided with a multiplicity of outlet fittings disposed along the ducts at short uniform intervals, these fittings extending upwardly toward the floor level. The spacing of the fittings is such that along the runs of ducts, outlets are provided in excess of normal requirements and by reason of the uniform spacing, it is easy to locate the fittings in the event that they should be concealed by a thin layer of floor material. While in this system, service is available at substantially all points along the ducts by reason of the relatively close spacing of the outlets, it sometimes happens that the runs of ducts in the network are separated such a distance that service cannot be provided at a point between the ducts without running wiring along the floor. Also, in some cases, wall or column outlets may be desired.

My invention is accordingly directed to the provision of a simple, cheap box which can be installed in the system and which provides a means for connecting one or more conduits to the duct to serve as extensions therefrom. Such a conduit may be laid in the floor and lead to a point on the floor remote from the duct or to a wall or column and upwardly therein to an outlet.

The new box is preferably made of cast iron and it includes an enclosure having necks on opposite sides into which the ends of aligned ducts may be inserted and held in position. In the wall of the box there are also provided aligned openings for the reception of the ends of conduits which are preferably threaded into the box walls. The conduit openings are preferably at a different level from the duct openings so that the conduits may be led away from the ducts to which they are connected and under other ducts in a multiple run. The interior of the box is open so that connections may be readily made between wiring in the conduits and wiring in the ducts and to facilitate the making of such connections, the box is provided with an opening with a cover which lies flush with the floor surface.

The new box is of such dimensions that it can be readily installed to replace a short length of one duct in a multiple duct run at the time the system is installed and before the floor is completed and the conduits are then connected to the box and the connections made in the usual way. These conduits may be led to any desired point and since connections can be made in the box and the box may lie at some distance from the ordinary floor boxes, the making of the connections does not require fishing from the outlet at the end of the conduit through the box and back to the nearest standard floor box.

For a better understanding of the invention, reference may be had to the accompanying drawing, in which Fig. 1 is a plan view partly in section of an underfloor duct system illustrating the use of the box;

Fig. 2 is an elevational view of part of the system showing the new box in position; and Figs. 3 and 4 are sectional views on the lines 3—3 of Fig. 1 and 4—4 of Fig. 3 respectively.

Referring now to the drawing, the system illustrated includes a standard junction box 10 in a duct system including rectangular ducts in double runs, the ducts being designated 11 and 12, 13 and 14, 15 and 16, and 17 and 18. The system illustrated is of the Walker type and the ducts are provided at spaced intervals with outlets 19 closed when not in use by caps 20. In the normal use of the system, the outlets 19 extend up to the floor surface so that the caps 20 are visible in that surface.

In such a system, it may be desirable to provide an outlet at a point remote from the runs of ducts which may be as much as 8 or 10 feet apart. Also, occasion may arise for an outlet for example, on a column 21. In such a situation, the usual outlet fitting 19 cannot well be employed for the purpose since it opens through the floor surface and consequently, even if an outlet fitting were avaliable close to the column, for example, exposed wiring might be necessary to lead to the point on the column where the receptacle was desired.

To meet this situation, the box 22 of my invention may be employed. This box is inserted in place of a portion of the rectangular duct 11 at the desired location. The box has openings 23 in its side walls in part defined by side flanges 24 and a bottom flange 24a and into the openings are inserted the ends of the duct which are then held in place by the usual grounding screws 25. The flanges are set back from the edges of the opening in the wall of the box to provide a rectangular abutment 24' around each opening, against which the end of the duct 11 bears. Also, the flanges may be channeled as indicated at 26 so that packing may be inserted between the outer surface of the duct and the flange for the purpose of making a tight joint.

Preferably the flanges in which the ends of the ducts are received lie somewhat above the bottom of the box and below those flanges, the side walls of the box may taper as indicated at 27. In the end walls are threaded openings 28 for the reception of the threaded ends of conduits 29, the openings 28 being at a different level from the openings 23 and preferably below them. The openings 23 have abutments 28' against which the ends of the conduits may bear. The interior of the box is open so that communication is afforded between the conduits and the ducts connected to the box.

The box is closed by a cover member 30 secured in place by screws 31 and this cover member has an opening 32 defined by a threaded neck 33 on which is mounted a cover 34. The cover is provided with an opening closed by cover plate 35 secured in position by screws 36. The threading of the cover on the neck permits the cover to be adjusted in position so that the cover plate will lie flush with the floor surface and when access to the box is desired, the screws 36 are removed, after which the plate 35 can be taken off, thus providing an opening into the interior of the box. The cover member has portions cooperating with the flanges 24 and 24ª to form rectangular sockets for the ends of the ducts, and the grounding screws 25 are mounted in the portions of the cover member.

In the construction illustrated in Fig. 1, the box is disposed near the column 21 and service is provided at a column outlet 37 by threading a short nipple 38 into one opening 28 in the box, suitable lengths of conduit 39, 40 and elbow fittings 41, 42 being employed to extend the conduit to the column and then up within the column to the outlet. From the other threaded opening in the box a conduit 39 is led to any desired point in the floor, being provided at its end with a fitting (not shown) which leads to the floor surface in position to receive a standard service fitting.

I claim:

1. A duct connection box, which comprises a hollow body having top and opposite side openings, downwardly and inwardly inclined side walls depending from the body, substantially vertical end walls depending from the body and connected to the side walls, a bottom connecting the side and end walls, said walls and bottom forming a well communicating with the interior of the body, the end walls of the well having openings for the reception of the ends of aligned conduits, connected vertical and horizontal flanges formed on the body around the side openings therein for the reception of ends of the ducts lying at a higher level than the conduits connected to the well, a ring threaded on the upper portion of the body for vertical adjustment with respect thereto, and a removable cover on the ring normally closing the top opening of the body for access to the interior and well of the box.

2. A duct connection box, which comprises a hollow body having a top opening and opposite side openings, flanges on the body forming substantially rectangular sockets around the side openings for the reception of the ends of aligned ducts, substantially vertical end walls depending from opposite sides of the box and having openings for the reception of conduit lying at a lower level than the duct, side walls connected to the end walls and depending from the body and inclined inwardly and downwardly for substantially following the contour of the conduit openings in the end walls to form a well with the end walls, a ring threaded on the upper portion of the body for vertical adjustment with respect thereto, and a removable cover on the ring normally closing the top opening of the body for access to the interior of the box.

HERVEY S. WALKER.